UNITED STATES PATENT OFFICE.

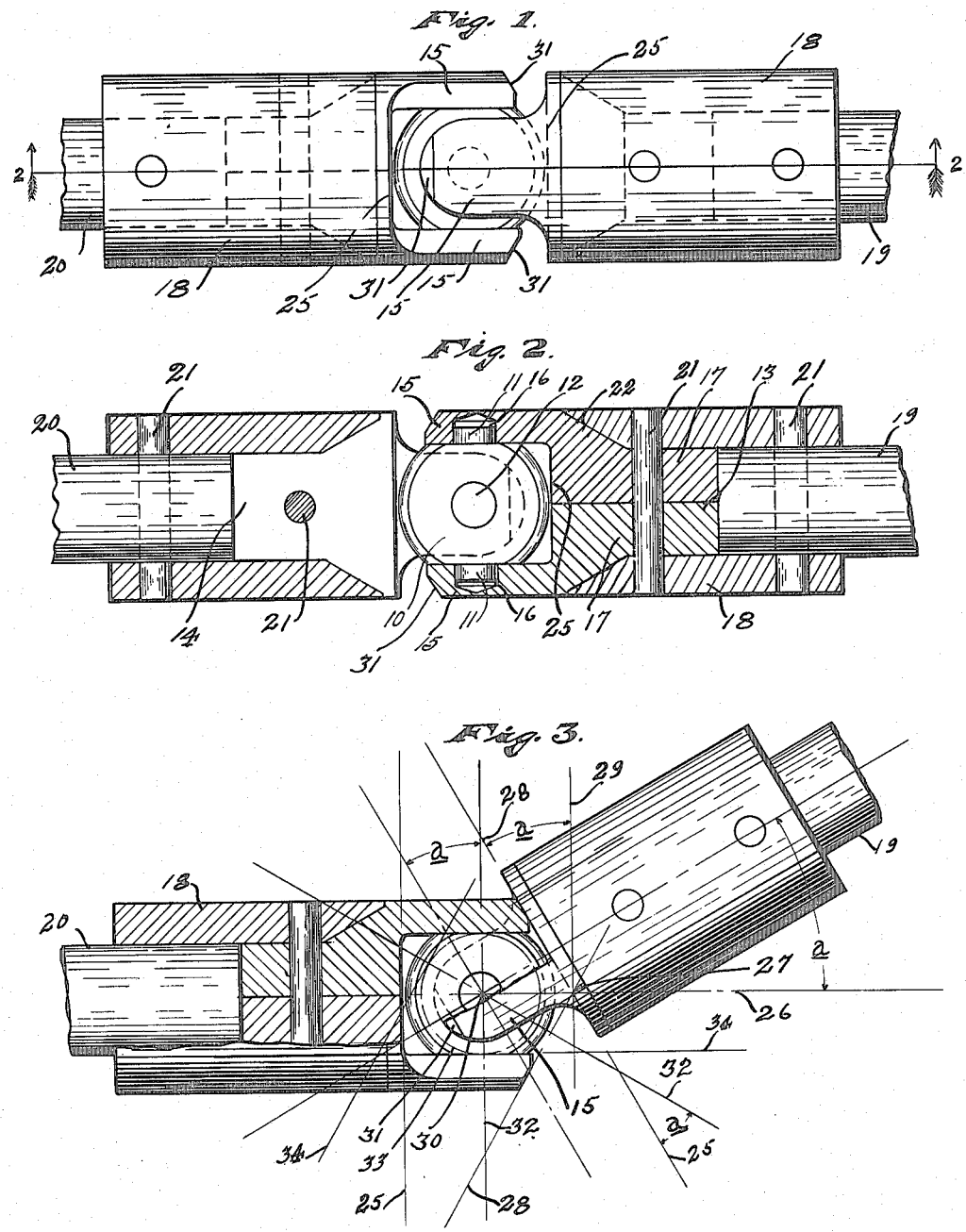

WILLIAM F. BOCKHOFF, OF RICHMOND, INDIANA, ASSIGNOR TO NATIONAL AUTOMATIC TOOL COMPANY, OF RICHMOND, INDIANA, A CORPORATION OF INDIANA.

UNIVERSAL JOINT.

1,143,596.  Specification of Letters Patent.  Patented June 15, 1915.

Application filed June 1, 1914. Serial No. 842,075.

*To all whom it may concern:*

Be it known that I, WILLIAM F. BOCKHOFF, a citizen of the United States, residing at Richmond, in the county of Wayne and State of Indiana, have invented a new and useful Universal Joint, of which the following is a specification.

Difficulty is often experienced in universal joints by reason of binding of the parts as the connected shafts are rotated, especially when such shafts are at rather large angles with each other.

It is the object of my present invention to eliminate the possibility of this binding and to strengthen and simplify the construction of universal joints. I attain this object by providing coöperating surfaces on the two parts to limit the angular displacement of the two connected shafts to a predetermined maximum, some of such surfaces always acting when this maximum displacement is reached, and construct the other parts of the universal joints so that they will not bind when such angular displacement does not exceed such maximum.

The accompanying drawings illustrate a universal joint embodying my invention.

Figure 1 is an elevation of such universal joint, showing the two shafts in alinement; Fig. 2 is a longitudinal section on the line 2—2 of Fig. 1; and Fig. 3 is a partly sectional view showing the two shafts displaced from each other the maximum allowable angle, and also showing diagrammatically the derivation of the shapes of the different parts.

The central member 10 of the universal joint has two pairs of trunnions 11 and 12, the two trunnions of each pair being in axial alinement and the axes of the two pairs of trunnions intersecting each other at right angles, these trunnions being shown as integral with the central member 10. On the two pairs of trunnions 11 and 12 are pivoted two members 13 and 14 respectively, each of these members being bifurcated to span the central member 10, the two arms 15 provided by the bifurcation of each such member having bearing holes 16 for the reception of the trunnions 11 or 12. In the arrangement shown, in which the trunnion pins 11 and 12 are integral with the central member 10, the two arms 15 of each member 13 and 14 are separable from each other, to permit the assembling of the parts, each of these arms being integral with a semi-cylindrical part 17 which combines with the corresponding semi-cylindrical part of the mating member to form a cylindrical stem which fits tightly within one end of a tubular member 18, the other end of such member being open to receive the end of one of the two shafts 19 and 20 to be connected. The cylindrical stem formed by the two parts 17, as well as the shaft ends, may be fastened in the tubular members 18 in any desired manner, as by pins 21. In the arrangement shown, the outer surfaces of the arms 15 are flush with the outer surfaces of the members 18, the arms fitting against the members 18 by engaging shoulders 22 provided by the offsetting of the arms 15 from the semi-cylindrical members 17 with which they are integral respectively. The bearing holes 16 extend from the inside of the arms 15 outward, but conveniently not quite to the outer surfaces of such arms.

That end of each stem formed by the two mating parts 17 toward the central member 10 is in the form of a plane 25 at right angles to the axis 26 of that member 13 or 14 of which said stem forms part. The maximum permissible angle of displacement between the axes 26 of the two members 13 and 14 being the angle $a$, the arms 15 of each member 13 and 14 lie wholly within a cone which has its apex 27 in the axis 26 of that member and the elements 28 of its surface at such angle $a$ from a plane 29 drawn through such apex 27 perpendicular to the axis 26 in which it lies, and the plane 25 of one member and the conical surface formed of the elements 28 of the other member are so relatively spaced from the center 30 of the central member 10 that they become tangent when the axes 26 of the two members 13 and 14 are displaced from each other by such maximum angle $a$. In addition to lying wholly within the cones formed by the elements 28, each arm 15 also has a surface 31 which lies in the surface of such cone for a sufficient angular distance around the corresponding axis 26 so that as the shafts 19 and 20 are turned with their axes displaced by the maximum angle $a$ the surface 31 on any arm 15 will not pass out of engagement with the plane surface 25 with which it coöperates until the surface 31 on the next arm 15

(extending from the other one of the parts 13 and 14) engages the other plane surface 25; the surfaces 31 may be as narrow as desired, a mere line being sufficient. Thus with the axes 26 of the two shafts 19 and 20 displaced the maximum permissible angle $a$, there is always engagement between the surface 31 on one of the arms 15 and one of the planes 25. In order to permit this continual engagement of some surface 31 with one or the other of the planes 25 during the rotation of the shafts 19 and 20 when their axes are displaced by this maximum angle $a$, it is necessary that the arms 15 be not too wide, as otherwise the inner edge of one arm 15 will catch against the adjacent inner edge of the next arm 15 at certain points in their movement. Therefore any part of any arm 15 which is liable to pass between the inner faces of the two adjacent arms 15 (on the other of the two members 13 and 14) is made sufficiently close to the axis of the trunnion pins 11 or 12 associated with such arm to do so. This is done by passing two planes 32 through such axis at the angle $a$ to the associated plane 25, and making the arms 15 sufficiently narrow so that all parts on each side thereof which lie between such plane are wholly within a cylinder 33 coaxial with such trunnion pins and having a diameter equal to the distance between the inner faces of the two arms 15 on either member 13 or 14, and so that all parts of such arms which project beyond such planes lie between two planes 34 tangent to the cylinder 33 at its two points of intersection with the planes 32 most distant from the planes 25 on the same members.

I claim as my invention:

1. A universal joint, comprising a central member, two bifurcated shaft members spanning said central member and pivoted thereto on perpendicular intersecting axes, the arms formed by the bifurcation of each of said shaft members having end surfaces lying in the surface of a cone coaxial with such bifurcated member, which conical surfaces coöperate with plane surfaces on the other shaft members respectively to limit the angular displacement between the axes of the two shaft members, the conical surfaces being of sufficient extent so that when the shaft members are rotated about their axes with such axes displaced by such maximum angle the conical surface on any arm of either shaft member remains in engagement with the plane surface on the other shaft member until the conical surface on an arm on said other shaft member engages the plane surface on the first shaft member.

2. A universal joint, comprising a central member, two bifurcated shaft members spanning said central member and pivoted thereto on perpendicular intersecting axes, the arms formed by the bifurcation of each of said shaft members having end surfaces which coöperate with surfaces on the other shaft members respectively to limit to a definite angle the angular displacement between the axes of the two shaft members, the surface on each arm being of sufficient extent so that when the shaft members are rotated about their axes with such axes displaced at such maximum angle the surface on any arm of either member remains in engagement with the coöperating surface on the other shaft member until the surface on an arm on said other shaft member engages the coöperating surface on the first shaft member.

3. A universal joint, comprising a central member, two bifurcated shaft members spanning said central member and pivoted thereto on perpendicular intersecting axes, the arms formed by the bifurcation of each of said shaft members having end surfaces lying in the surface of a cone coaxial with such bifurcated member, which conical surfaces coöperate with plane surfaces on the other members respectively to limit the angular displacement between the axes of the two shaft members, the cone in which lies the conical surfaces of the two arms of each member becoming tangent with the plane surface on the other member when the axes of the two members are displaced at said maximum angle and the conical surfaces on each arm being of sufficient extent so that during the rotation of the shaft members at such maximum angular displacement one of said conical surfaces is always in engagement with one of said planes.

4. A universal joint, comprising a central member, two bifurcated shaft members spanning said central member and pivoted thereto on perpendicular intersecting axes, the arms formed by the bifurcation of each of said shaft members having end surfaces lying in the surface of a cone coaxial with such bifurcated member, which conical surfaces coöperate with plane surfaces on the other shaft members respectively to limit the angular displacement between the axes of the two shaft members, the conical surfaces being of sufficient extent so that when the shaft members are rotated about their axes with such axes displaced by such maximum angle the conical surface on any arm of either shaft member remains in engagement with the plane surface on the other shaft member until the conical surface on an arm on said other shaft member engages the plane surface on the first shaft member, and such parts of the arms of each member as pass between the arms of the other member as the shaft members are rotated being sufficiently narrow so that they do not bind on said last-named arms.

5. A universal joint, comprising a central member, two bifurcated shaft members spanning said central member and pivoted thereto on perpendicular intersecting axes, the arms formed by the bifurcation of each of said shaft members having end surfaces which coöperate with surfaces on the other shaft members respectively to limit to a definite angle the angular displacement between the axes of the two shaft members, the surface on each arm being of sufficient extent so that when the shaft members are rotated about their axes with such axes displaced at such maximum angle the surface on any arm of either member remains in engagement with the coöperating surface on the other shaft member until the surface on an arm on said other shaft member engages the coöperating surface on the first shaft member, and such parts of the arms of each member as pass between the arms of the other member as the shaft members are rotated being sufficiently narrow so that they do not bind on said last-named arms.

6. A universal joint, comprising a central member, two bifurcated shaft members spanning said central member and pivoted thereto on perpendicular intersecting axes, the arms formed by the bifurcation of each of said shaft members having end surfaces lying in the surface of a cone coaxial with such bifurcated member, which conical surfaces coöperate with plane surfaces on the other members respectively to limit the angular displacement between the axes of the two shaft members, the cone in which lies the conical surfaces of the two arms of each member becoming tangent with the plane surface on the other member when the axes of the two members are displaced at said maximum angle and the conical surfaces on each arm being of sufficient extent so that during the rotation of the shaft members at such maximum angular displacement one of said conical surfaces is always in engagement with one of said planes, and such parts of the arms of each member as pass between the arms of the other member as the shaft members are rotated being sufficiently narrow so that they do not bind on said last-named arms.

In witness whereof, I, have hereto set my hand at Richmond, Indiana, this twenty-eighth day of May, A. D. one thousand nine hundred and fourteen.

WILLIAM F. BOCKHOFF.

Witnesses:
EDWARD D. FRANK,
REGINA M. BRODERICK.